(12) United States Patent
Gioberti

(10) Patent No.: US 7,305,073 B2
(45) Date of Patent: Dec. 4, 2007

(54) RATE MODELLING

(75) Inventor: Stefano P Gioberti, London (GB)

(73) Assignee: British Telecommunications, London (GB)

( * ) Notice: Subject to any disclaimer, the term of this patent is extended or adjusted under 35 U.S.C. 154(b) by 385 days.

(21) Appl. No.: 10/533,902

(22) PCT Filed: Nov. 12, 2003

(86) PCT No.: PCT/GB03/04958

§ 371 (c)(1),
(2), (4) Date: May 5, 2005

(87) PCT Pub. No.: WO2004/045142

PCT Pub. Date: May 27, 2004

(65) Prior Publication Data

US 2006/0039543 A1    Feb. 23, 2006

(30) Foreign Application Priority Data

Nov. 13, 2002   (GB) ................................. 0226488.5

(51) Int. Cl.
*H04M 15/00*     (2006.01)
*G06M 17/60*     (2006.01)

(52) U.S. Cl. .............................. 379/114.03; 379/114.06; 705/34; 705/400; 705/409

(58) Field of Classification Search ................ 379/111, 379/114.01, 114.03, 114.06, 121.02, 121.04; 705/1, 34, 400, 402, 409–410, 418
See application file for complete search history.

(56) References Cited

U.S. PATENT DOCUMENTS

| | | | |
|---|---|---|---|
| 4,726,056 A | * | 2/1988 | An et al. ................ 379/114.01 |
| 5,303,297 A | * | 4/1994 | Hillis ......................... 455/406 |
| 5,420,914 A | * | 5/1995 | Blumhardt ............. 379/114.09 |
| 5,488,655 A | * | 1/1996 | Hamlen ................. 379/114.06 |
| 5,802,502 A | * | 9/1998 | Gell et al. ..................... 705/37 |
| 5,930,343 A | * | 7/1999 | Vasquez ................. 379/114.01 |
| 6,044,259 A | * | 3/2000 | Hentila et al. .............. 455/406 |
| 6,104,792 A | * | 8/2000 | Lautenschlager et al. ... 379/130 |
| 6,263,058 B1 | * | 7/2001 | Lautenschlager et al. ...................... 379/114.29 |
| 6,327,466 B1 | | 12/2001 | Savolainen |
| 6,456,986 B1 | | 9/2002 | Boardman et al. |
| 2001/0056362 A1 | | 12/2001 | Hanagan et al. |

OTHER PUBLICATIONS

International Search Report mailed Apr. 7, 2005 in PCT/GB2003/004958.

* cited by examiner

*Primary Examiner*—Binh K. Tieu
(74) *Attorney, Agent, or Firm*—Nixon & Vanderhye P.C.

(57) ABSTRACT

A method and apparatus are provided for generating a rate model (115) for use in determining a rate to be applied with respect to an instance of a product or service, system or process. The rate may relate for example to utilisation of a resource, for example to a charging rate to be applied with respect to use of a product or service. The rate model comprises: (i) data (205, 210) defining a rating space having at least one dimension defined by an attribute of the system, process, product or service; (ii) a rating vector definition comprising at least one rate parameter; and (iii) data (225, 230) which defines distinct regions in the rating space over which the defined rating vector is invariant, and which defines the respective invariant rating vector (235) for each distinct region (225, 230). A rate applicable to a particular instance of a product or service instance is determined by identifying a defined region (225, 230) containing the instance and hence the invariant rate parameter values (235) of the applicable invariant rating vector.

20 Claims, 6 Drawing Sheets

RATE MODELLING

This application is the US national phase of international application PCT/GB2003/004958 filed 12 Nov. 2003 which designated the U.S. and claims benefit of GB 0226488.5, dated 13 Nov. 2002, the entire content of which is hereby incorporated by reference.

This invention relates to rate modelling and, in particular, to a method and apparatus for determining the appropriate rate to apply in respect of systems or processes, or to specific instances of a product or service.

It is known in the field of telecommunications, for example, to model tariff rules and the corresponding charging rates to be applied according to those rules when billing for provision and use of telecommunications services. Typical tariff modelling methods in the telecommunications field are those used in the arbor® billing platform and in Convergys'® Geneva billing software. However, whilst these systems provide a basic model of tariff rules and charging rates, these systems appear to have been designed primarily for use with products comprising a relatively small number of different tariffs, for example voice telephony products for which the price to be charged for use of the product is largely a function of time at a relatively small number of different charging rates, e.g. a local call rate, a national call rate, a rate for calls to mobile telephones and a rate for "premium rate" calls.

Consider an example of a voice telephony product for which the price for making a telephone call is a function not only of the duration of the call but also of the distance, rounded up to the nearest kilometre, between the calling party and the respective called party. To define the charging rate to be applied in calculating the price of calls, prior art tariff rate models would require a different tariff to be defined for every discrete distance measure from 1 kilometre (km) up to the maximum distance likely to occur. Each tariff would define the charging rate to be applied when calculating the price of calls over the respective calling distance. To calculate a price for a particular call of given calling distance and duration, firstly the appropriate tariff would be selected for the given calling distance, and secondly the charging rate defined for that tariff would be used to calculate the price for the call of given duration. Fortunately, a more conventional voice telephony product may comprise only two distance-related charging rates, one for local-rate calls of up to 56 km and one for national-rate calls of over 56 km. Such a product requires only two tariffs to be defined in prior art tariff rate models. But it is clear that in prior art systems, modelling the tariffs for more complex products can entail either the definition and entry of a great many different tariffs with very similar descriptions, which slows down processing for billing runs and can be onerous both for initial data entry and for subsequent tariff revisions, or the imposition of an artificial simplification (or complication) of the charging structure for those products in order for the billing system to work. Having a great many similar tariffs can also complicate provisioning processes if users must select from large lists of tariffs with very similar descriptions, so increasing the likelihood of errors being made.

There are other situations in which the rate of consumption of resources must be modelled in relatively complex systems or processes. The applicable rate of consumption of a resource in respect of a particular combination of parameters of a system or process may be difficult to determine where a number of different parameters can affect the rate to be applied. Besides, in known techniques for modelling rates, when rules or rate data are changed or new rules and rates are to be added, updating of models can be time consuming and error prone.

According to a first aspect of the present invention, there is provided an apparatus for determining a rate to be applied in respect of a data set comprising a value for at least one variable attribute in an electronic system or process, comprising:

an input for receiving the data set;

a rate modelling component arranged to store a model comprising:
  (i) data defining a rating space having at least one dimension defined by an attribute of the electronic system or process;
  (ii) a rating vector definition comprising at least one rate parameter; and
  (iii) data which defines distinct regions in the rating space over which the defined rating vector is invariant, and which defines the respective invariant rating vector for each distinct region; and rate determining means arranged, on receipt of the data set, to identify a corresponding one of the distinct regions, the respective invariant rating vector and hence the rate to be applied in respect of the data set.

An apparatus according to the first aspect of the present invention provides for a particularly flexible technique both for modelling rates to be applied in respect of electronic systems or processes, products or services, and for determining the rate to apply in respect of a specific instance of variable attributes of that system, process, product or service. A so-called rating space may be defined in terms of any number of dimensions and hence of rate-affecting attributes, be they variable or discrete quantities, of the entity whose rates are being modelled. Whereas prior art modelling arrangements are known to limit the number or variable rate-affecting attributes that may be used in modelling a rate, particularly in the domain of billing for telecommunications services, the present invention avoids such limitations.

In a preferred embodiment, the apparatus according to this first aspect further comprises calculating means for calculating an output in respect of the data set by inputting one or more rate parameters of the identified invariant rating vector into a predefined formula.

The rate may relate to utilisation of one or more resources in respect of the system, process, product or service and hence the output may define the quantity of the resource in respect of a particular instance of the system, etc. The rate may alternatively relate to a charging rate and hence the output may determine a price to be charged for a particular level of use of the system, etc.

Preferably, the model further comprises a rule for selecting a predefined formula in respect of the data set from among a plurality of predefined formulae. At least one rule may also be defined for selecting an appropriate rating space, from among a plurality of rating spaces defined in the model, on the basis of at least one attribute represented in the data set. These rules provide for even greater flexibility in the model, enabling numerous variations on the system, process, product or service to be supported in the same model, each with its own rating structure if required.

According to a second aspect of the present invention, there is provided a method for determining a rate to be applied in respect of a product or service, comprising:

(i) defining a rating space having at least one dimension defined by an attribute of the product or service;

(ii) defining a rating vector comprising at least one rate parameter;

(iii) determining distinct regions in the rating space over which the defined rating vector is invariant and defining values for the at least one rate parameter in the invariant rating vector for each distinct region;

(iv) for a specified instance of the product or service, identifying a corresponding one of the distinct regions from (iii), the respective invariant rating vector and hence the rate to be applied.

The method according to this second aspect of the present invention enables the modelling in data of the attributes that influence the rate to be applied to particular instances of a product or service. For any product or service it is assumed that there will be a number of distinct attributes, the particular values of which not only distinguish an instance of that product or service but are also sufficient to fully define the instance for the purposes of selecting an applicable rate. Such attributes are preferably used to define the dimensions for the rating space according to this method. The rate may relate to a rate of utilisation of a resource in respect of the product or service, for example it may relate to a charging rate for use in determining a price to be charged for a particular level of use of the product of service.

In practice, different categories of a product or service may be defined which, from a rate perspective, can each be dealt with as a single unit and the rules for determining an applicable rate for each category of the product or service may be embodied in the rate model.

Considering an example whereby the apparatus and method according to this first and second aspect respectively are used to model the charging rates for use of a particular category of a product, the price for a particular level of use of the product is determinable on the basis of a series of n orthogonal dimensions, to be referred to as "tariff dimensions", forming an n-dimensional rating space. These tariff dimension are used to define the tariff rules and the rates to be charged. In practice, the tariff dimensions do not need to be orthogonal, although selection of a non-orthogonal set of dimensions may lead to an unnecessary complicating of the model. Formally, the price for a category of product is some function (F) of a vector D of tariff dimension values and a vector R of invariant rate parameters—the "rating" vector. By partitioning the rating space into distinct regions, additional flexibility exists in the selection of the rating vector. In particular, it is possible to define and store a different invariant rating vector for each distinct region.

When a price is to be determined for a particular instance of a category of the product, the point represented by a vector D of tariff dimension values defining that instance of the product category is located within one of the pre-defined regions of the n-dimensional rating space for that category and, having identified the containing region, the applicable rating vector R is identified. The identified rating vector R is then passed, together with the vector D of instance values, to a "plug-in" component comprising a pricing function for that product category arranged to combine the rating vector parameters and tariff dimension values according to an arbitrarily complex formula and to calculate a price for use of the particular instance of the product.

Applying embodiments of the first aspect of the present invention to the example of the voice telephony product mentioned above, there would be no difficulty in defining a single tariff for which the charging rate to be applied is a function of both the variable call duration and the variable calling distance. Furthermore, the calculating means may be arranged to apply a formula for calculating a price that includes not only the use-related (duration and distance) costs but also any fixed costs or price adjustments for the product to take account of tax or volume discounts, all on the basis of a single tariff rate structure. In addition, by making currency a dimension, it is possible to have "non-linked" price lists for different territories and to implement, for example, "price-pointing" simultaneously in each of those territories.

Prior art tariff rate models do not offer such a flexible capability. Furthermore, attempts to model some of the products provided by the present applicants using prior art billing platforms have to-date failed due to the intrinsic limitations of their respective rate models.

According to a third aspect of the present invention, there is provided a method of generating a model of rates to be applied in respect of a product or service, comprising the steps of defining, in the model:

(i) a rating space for the product or service having at least one dimension defined by an attribute of the product of service;

(ii) a rating vector definition comprising at least one rate parameter;

(iii) at least one distinct region in the rating space over which the defined rating vector is invariant; and (iv) in respect of each distinct region from (iii), values for the at least one rate parameter of the respective rate vector.

A rate modelling method according to this third aspect of the present invention results a highly flexible rate model, enabling rules for the determination of rates for complex products or services to be modelled in a logical and straightforward manner. In comparison with prior art arrangements, the present modelling method simplifies the initial input of rate data and the subsequent amendment both of specific rates and the overall rating structure for a product or service, or electronic system or process. There are no inherent restrictions for example on the number of rate-affecting dimensions that define the rating space in the model.

In a preferred embodiment, the rate modelling method according to this third aspect of the present invention further comprises the steps of defining, in the model:

(v) at least one category of the product or service for which a common rating space applies; and (vi) at least one rule for selecting an applicable rating space from among a plurality of rating spaces defined in the model, to be applied in respect of the at least one category defined in (v).

In a further preferred embodiment, the rate modelling method further comprises the steps of defining, in the model:

(vii) a reference to a formula for use in calculating an output in respect of the at least one category identified in step (v), the formula being a function of at least one unspecified dimension and at least one rate parameter; and (viii) in respect of the at least one category defined in (v), an association between the at least one unspecified dimension in the formula and a dimension for the applicable rating space.

Where the rate modelling method in the present invention is applied specifically to the modelling of charging rates for use in determining a price for use of a product or service, the inherent flexibility of the rate model resulting from this method enables product categories and an associated tariff structure to be defined and updated from the perspective of ideal marketing strategy and greatest customer convenience rather than from the perspective of limitations in the model structure and/or the corresponding billing system, a limitation in prior art tariff rate modelling arrangements.

According to a fourth aspect of the present invention, there is provided a method for determining the utilisation of a resource in respect of an instance of a product or service with reference to a rate model generated for the product or service by the method of the third aspect of the present invention, comprising the steps of:

(i) receiving data defining an instance of the product or service;

(ii) identifying a distinct region in a rating space for the product or service containing the defined instance received at step (i);

(iii) identifying the invariant rating vector applicable to the identified region;

(iv) identifying a formula to be applied to instances of the product or service; and (v) inputting the at least one rate parameter value of the invariant rating vector and the received data defining the instance into the formula to calculate the utilisation of the resource for the instance of the product or service.

In a preferred embodiment of the present invention, an extensible Markup Language (XML) interface is provided to enable updates to the model to be defined in an XML data file and validated against a predefined Document Type Definition (DTD), reducing the likelihood of errors arising through conventional data entry at a user interface. A definition and description of XML is published on the Internet by the Worldwide Web Consortium (W3C).

In general, where the term "product" is used in isolation in the present patent specification, it is intended to relate not only to a product as such, but also to a service or a technical entity for which tariffs or other rates are to be modelled.

Preferred embodiments of the present invention will now be described in detail, by way of example only, with reference to the accompanying drawings of which:

Preferred embodiments of the present invention provide a particularly flexible rate modelling arrangement suitable for use in many different arrangements in which a rate must be determined with respect to a system, process, product or service. The rate may relate to anything. However, for the purpose of describing the inventive features of the present invention, the detailed description that follows will be set in the context of modelling rates to implement a tariff structure for pricing the rental and/or use of a product or service, in particular a telecommunications product or service. In this context, the term "tariff" will be used to refer to a general scheme or collection of rules for determining the rate of charging with respect to the product or service; and the term "rate" will be used to refer to a value determined according to the set of rules known as the "tariff". However, it would be readily apparent to a person of ordinary skill that the principles described may be applied to other contexts relating to other types of product or service and to resources in electronic systems and in processes.

Many of the known billing systems provide some form of tariff rate model to store information relating to tariffs and corresponding charging rates, but often with inherent inflexibilities making them unsuitable for modelling tariffs for more complex products and services. The tariff rate modelling arrangement according to preferred embodiments of the present invention may be used in place of a conventional tariff rate model in such billing systems, or it may be integrated into an existing tariff rate model to make some or all of the resultant benefits of the present invention available in such systems.

Figure 1:
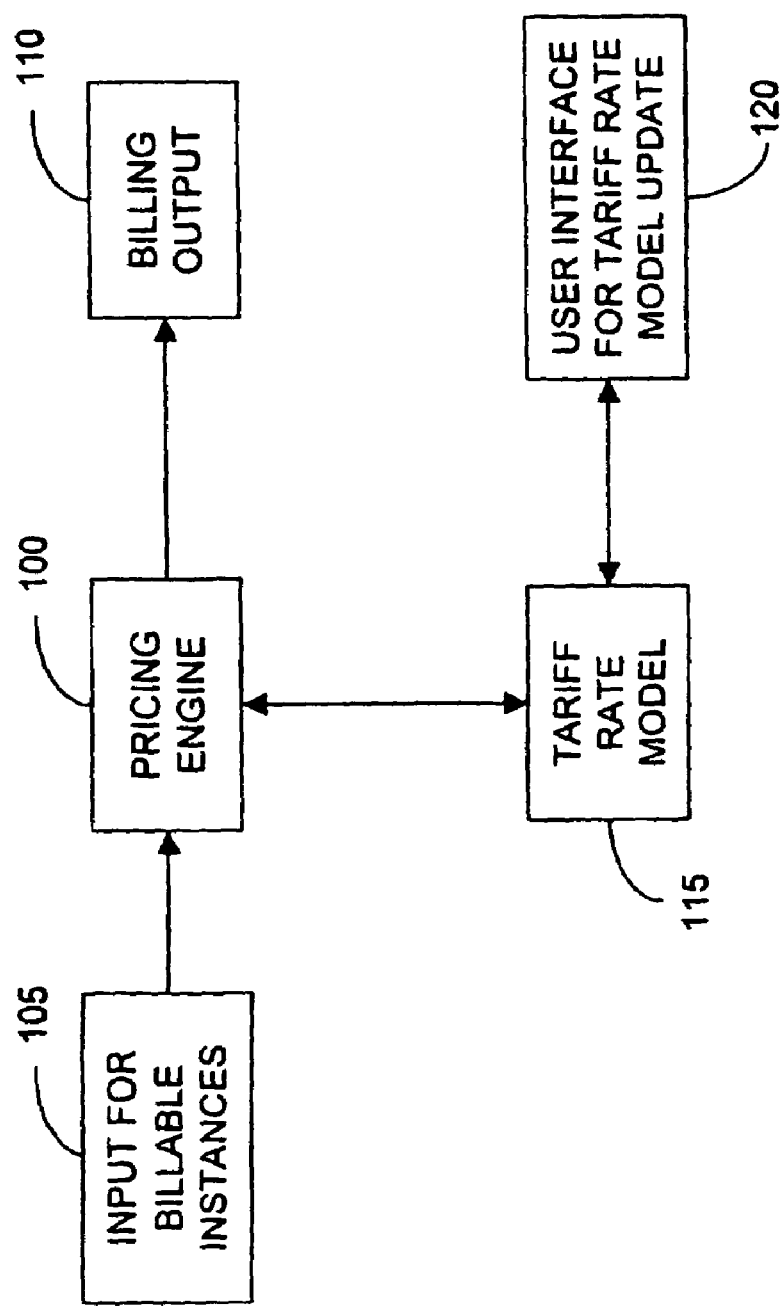
FIG. 1 is a diagram showing the principal components of a known billing system.

Referring to FIG. 1, a diagram is provided showing the basic components of a conventional billing system. A pricing engine 100 receives, by way of an input 105, details of billable instances of a product or service for which a price must be calculated and output 110. The pricing engine 100 refers to a tariff rate model 115 to obtain details of the charging rate to be applied to each received billable instance (105). A user interface 120 or other form of interface is provided to enable updates to be made to the tariff rate model 115 and to provide an interface for querying the contents of the tariff rate model 115, e.g. for audit purposes.

Tariff Rate Model Structure

Figure 2:
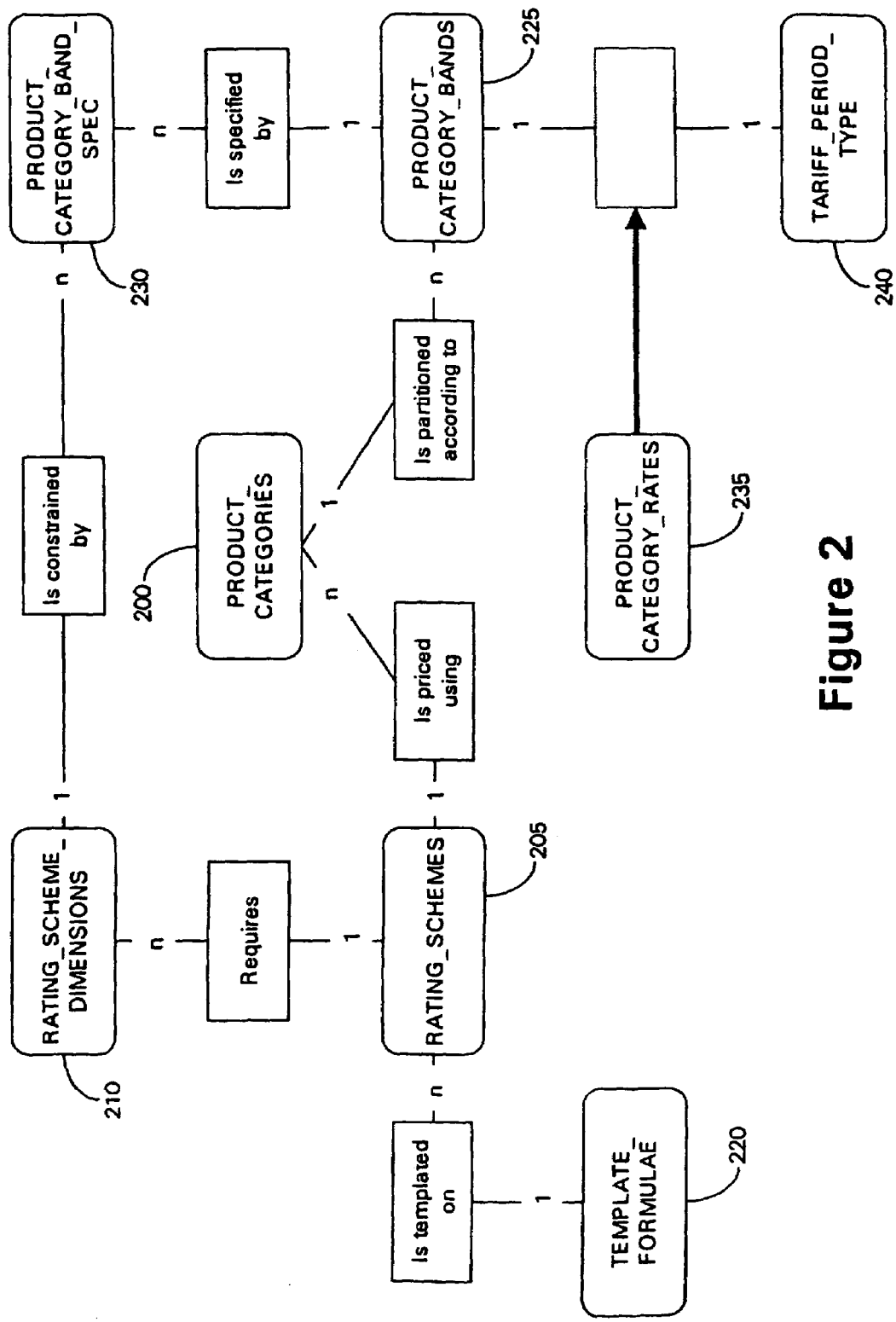
FIG. 2 is an entity relationship diagram for a tariff data model according to a preferred embodiment of the present invention.

There will now be described a tariff rate model according to a first embodiment of the present invention. The tariff rate model will be described in general terms with reference an entity relationship diagram shown in FIG. 2. While the entity relationship diagram of FIG. 2 is intended to show all the main data entities in this preferred embodiment of the tariff rate model, certain data entities that are not essential to the modelling of tariffs for a particular product or service are omitted. For example, amongst data entities omitted are those defining the valid ranges for certain tariff dimensions, useful in particular to a pricing engine 100 for checking the validity of product or service instances to be priced. Also omitted from FIG. 2 are entities and attributes that would be necessary if the tariff rate model were used for products or services being offered simultaneously in more than one country and hence for which different language and currency attributes must be supported. For the purpose of describing this first preferred embodiment of the present invention, it is assumed that the tariff rate model will be used in respect of a single currency and language (English). Extensions to the tariff rate model to accommodate other languages will not be described further in the present patent specification as it would be clear to a person skilled in the field of database design to make any necessary additions to the tariff rate model structure without further invention.

Referring to FIG. 2, each entity of the tariff rate model will now be described in turn, with a description of the attributes relevant to each entity and the implicit or explicit relationships between those entities. As is conventional in such diagrams, where an explicit relationship is shown to exist between two entities, any attributes for effecting such a relationship are omitted from the respective attribute lists of the respective entities.

Product_Categories (200)

Product Categories are distinct categories of a product which, from a tariff perspective, can be dealt with as a single unit. However, the particular choice of breakdown of a product into distinct categories need not be driven solely by tariff considerations. The tariff rate model provides sufficient flexibility in the modelling of tariffs to enable an ideal marketing breakdown for the product to also influence the choice of categories. However, it is intended that all instances of a product category share the same set of tariff-related attributes and that all such instances are priced in the same consistent manner. The rules for pricing instances of a particular product category are normally communicated by the supplier to its customers through published price lists.

To enable the definition of each category for a given product or service, the tariff rate model comprises a product category entity 200 having the following attributes:
- identifier A unique identifier for the product category.
- creation date The date on which the product category is defined in the tariff rate model.
- active date The date from which the product category can first be used to create billable product instances.
- inactive date The date from which the product category can no longer be used to create product instances. Where a product category is still active, and no inactive date is known, a NULL value will be used here.

Rating_Schemes (205)

The rating scheme entity 205 provides for the definition of a general tariff strategy based upon a knowledge of a set of price-affecting tariff dimensions and a set of tariff rates. A given rating scheme (205) may be used in determining prices for more than one different product category (200), but a particular product category (200) will use only one rating scheme (205). In practice an identifier for an applicable rating scheme (205) will be stored against each product category (200).

To enable the definition of one or more rating schemes that may be applied to products or services, the tariff rate model further comprises a rating scheme entity 205 having the following attributes:
- identifier An unique identifier for the rating scheme.
- creation date The date on which the rating scheme was defined in the tariff rate model.
- number of The number of tariff dimensions to be used by the
- dimensions rating scheme.
- number of rates The number of rate parameters to be used in each tariff constants vector.

Rating_Scheme_Dimensions (210)

The rating scheme dimensions entity 210 provides for the definition of a set of tariff dimensions to be used in a particular rating scheme (205). This entity provides in an index attribute for use with each defined tariff dimension. As will become apparent from the description below, a pricing formula may comprise an arbitrarily complex function of one or more unspecified tariff dimensions each distinguished by an index value. The rating scheme dimensions entity 210 enables a specific tariff dimension to be associated with an otherwise unspecified dimension appearing in a pricing formula by assigning the same index value to the respective dimension index attribute.

A particular rating scheme (205) is based upon one or more rating scheme dimensions (210), but each defined rating scheme dimension (210) will be used in only one rating scheme (205). In practice, an identifier for a respective rating scheme (205) will be associated with a particular rating scheme dimension (210).

To enable the definition of one or more rating scheme dimensions for a particular rating scheme (205), the tariff rate model further comprises a rating scheme dimension entity 210 having the following attributes:
- identifier An identifier for the rating scheme dimension.
- dimension index The index value for the dimension (may correspond to an indexed dimension value in a pricing formula).

Template_Forumlae (220)

The template formulae entity 220 provides for the definition of various predetermined pricing formulae that can be used as templates in creating a rating scheme (205) within the tariff rate model. Each template formula defined by this entity 220 may be used to price instances under one or more rating schemes (205). In practice therefore, an identifier for the applicable template formula (220) will be associated with particular rating scheme (205).

A template formula referenced by this entity is defined as an arbitrarily complex function of one or more tariff dimensions and one or more rate parameters. Each distinct tariff dimension and rate parameter used in a template formula is assigned a different index value, e.g. rate parameters $r(0)$, $r(1)$ and $r(2)$, tariff dimensions $dim(0)$ and $dim(1)$. For convenience, the entity includes an optional, non-executable equation object to visually represent the template pricing formula implemented by the referenced function. Additional flexibility is provided within this template entity with the option to specify one of a number of different functions for implementing a particular template pricing formula in calculating a price for instances of a product.

To enable the definition of a template pricing formula for use by particular rating schemes (205), the tariff rate model further comprises a template formulae entity 220 having the following attributes:
- identifier A unique identifier for the template.
- no_dimensions The number of dimensions used algebraically in the underlying formula.
- no_rates The number of rates used by the underlying formula.
- function The identity of a predetermined function implementing the pricing formula.
- creation_date The date on which the template is created.
- formula An optional, non-executable equation object for visually defining the underlying template pricing formula.

Product_Category_Bands (225)

The product category bands entity 225 provides for the definition of one or more regions ("bands") in the tariff space for a particular product category (200) over which a vector R (the "rating vector"), formed by values of the rate parameters in the applicable pricing formula (220), are constant. That is, all instances of the product category (200) falling within a particular product category band are priced using the same rate parameter values. For example, if there are three rate parameters $r(0)$, $r(1)$ and $r(2)$ defined in a pricing formula, then the rating vector R is the vector formed by those three rate parameters, i.e. $R=\{r(0), r(1), r(2)\}$, or more specifically, by the values those parameters take.

To enable the definition of one or more product category bands for a particular product category (200), the tariff rate model further comprises a product category band entity 225 having the following attributes:
- identifier An unique identifier for the band.
- creation date The date on which the band was defined in the tariff rate model.
- active date The date from which the band is to be considered active from a tariff perspective.
- inactive date The date from which the band is to be considered inactive from a tariff perspective.

Product_Category_Band_Spec (230)

The product category band specification entity 230 provides for the definition of the non-overlapping boundaries in the tariff space for a particular product category (200) of each defined product category band (225). The boundaries are defined in terms of ranges for one or more of the applicable tariff dimensions (see rating scheme dimensions (210)). In practice, with each product category band specification (230) there will be stored the index value for the corresponding rating scheme dimension (210) and an identifier for the respective product category band (225).

To enable the definition of the boundaries in tariff space for each defined product category band (225), the tariff rate model further comprises a product category band specification entity 225 having the following attributes:

identifier The identity of a tariff dimension.

lower limit The lower boundary value of the dimension for the band. The band defined by the lower_limit and the upper_limit are inclusive of the lower boundary value.

include upper limit An indication of whether the upper limit should be considered inclusive or exclusive of the upper boundary value.

upper limit The upper boundary value of the dimension for the band.

Product_Category_Rates (235)

This associative entity provides for the specification of a particular rating vector R to be applied in determining the price for instances of a particular product category (200) falling within the bounds of a particular product category band (225) and for a particular tariff period type (240—see below).

To enable the definition of an applicable rating vector, the tariff rate model further comprises a product category rates entity 235 having the following attributes:

period_type The type of period to which the rating vector relates.

product_category_ The product category band to which the tariff band identifier constants vector relates.

component identifier The identity of a rate parameter component of the rating vector. For example, where there are 3 components to the rating vector RB then the components will be identified by the integers 0, 1 and 2.

value The value of the identified component of the tariff rating vector.

Tariff_Period_Type (240)

Depending on the product being supplied, and whether it is supplied on a continuous or non-continuous basis, there may exist the requirement to associate multiple tariffs with a particular product category (200).

As an example, consider a service provided to a customer over some period of time, and for which a service charge is applied on a cyclic basis in advance of the customer receiving that service. It may be that contractually, the customer is committed to paying for that service on a quarterly basis, in which case the price list would publish the quarterly tariff. However, it may be that the service provider wishes to offer an annual charging cycle in addition to the quarterly cycle. Further, in order that the customer be provided with an incentive to pay for the service for a year in advance rather than a quarter in advance, the service provider sets an annual tariff which is less than four times the corresponding quarterly tariff. Hence the requirement to associate multiple tariffs (for different period types) with the same product category (200).

In any case, even where only a single tariff per product category (200) is to be recorded, it may be that different product categories (200) require tariffs for more than one cycle, and consequently knowledge of the cycle is required.

This complex relationship, involving the associative product category rates entity 235, defines the following:

a product category rate (235) exists for a single product category band (225) for a single tariff period type (240), and is one element of the rating vector R for that combination;

a product category band (225) may have multiple sets of product category rates (235); one for each period type (240).

To enable the definition of different tariff period types, the tariff rate model further comprises a tariff period type entity 235 having the following attributes:

identifier An unique identifier used to represent the tariff period type.

Having described the structure of a tariff data model, preferred means for making updates to the model will now be described.

XML Interface

In a preferred embodiment of the present invention, an extensible Markup Language (XML) interface is provided to enable updates to be made to the contents of a tariff data model. The XML interface enables updates to be specified in an XML data file of a format defined according to a predetermined Document Type Definition (DTD). The DTD defines the permitted structure and syntax for XML data files specifically for use in updating the tariff rate model. The XML interface comprises an XML file processor designed to interpret XML elements defined in the DTD and hence to process the contents of a submitted XML data file and to make updates to the respective parts of the tariff data model. It is not necessary for users making updates to the tariff data model to be aware of the actual structure of the model as the XML processor interprets the XML elements accordingly.

Preferably the XML interface provides users with a validating XML editor, designed to validate a user's input against the DTD and so preventing badly formed or invalid XML documents being submitted to the XML file processor.

Tariff Rate Model Generation

A preferred process will now be described, with reference to FIGS. 3, 4 and 5, for generating a tariff rate model (of the preferred type as described above with reference to FIG. 2) for a product or service. The preferred process will firstly be described in general terms and secondly in the context of a worked example based upon the present applicant's Kilostream® product, a product designed to provide exclusive-use point-to-point data links with a choice of data transfer rates. More particularly, the worked example will demonstrate a use of the XML interface to the tariff rate model, as described above, for entering data.

Figure 3:
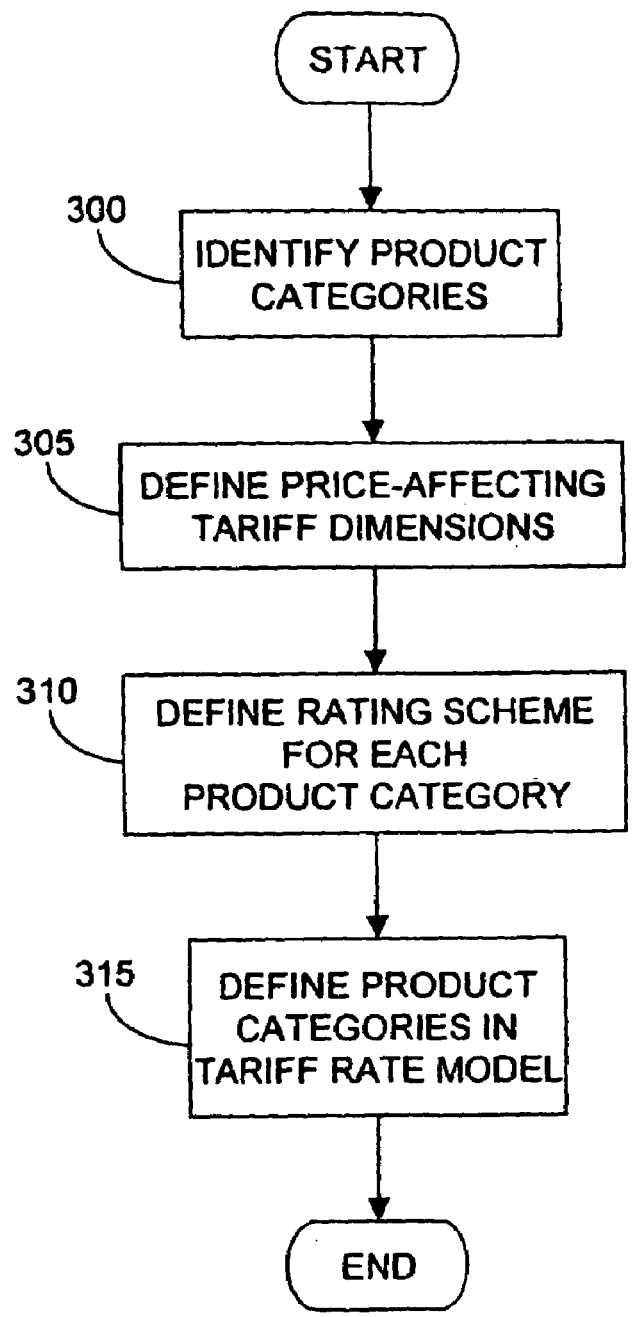
FIG. 3 is a flow diagram showing the principal steps in generating a tariff data model for a product or service, according to a preferred embodiment of the present invention.

Referring to FIG. 3, a flow diagram showing the main steps in operation of the preferred process, and additionally to FIG. 2 in respect of the data entities involved at each step, the preferred process STARTs and at STEP 300 the most appropriate breakdown of categories (200) for a particular product or service is chosen. The choice of product categories (200) will typically take account not only of the tariff structure for the product or service, but also the way in which the product or service is to be marketed. At STEP 305 the price-affecting tariff dimensions for the product are identified and, if not already entered, may be defined in an optional extension to the tariff rate model. Such a definition for each price-affecting dimension preferably includes a name for the dimension, whether it is a continuous or a discrete entity and, if continuous, the range of values permitted. At STEP 310 the rating scheme (205) is defined for each category (200) of the product identified from STEP 300. Each rating scheme (205) defines the tariffs to be applied by a pricing engine 100 in calculating a price for instances of the product or service category (200). Finally, at STEP 315, each product category (200) identified from STEP 300 is formally defined within the tariff rate model.

The STEP 310 for defining the rating scheme (205) to be applied to each product category (200) itself comprises several steps as will now be described with reference to FIG. 4. As was described above with reference to FIG. 2, a rating scheme (205) may be defined in terms of a general pricing formula (220) and an association (210) between the unspecified tariff dimensions and rate parameters used in the formula (220) and the specific tariff dimensions and units of measurement for the respective product or service category (200).

Figure 4:
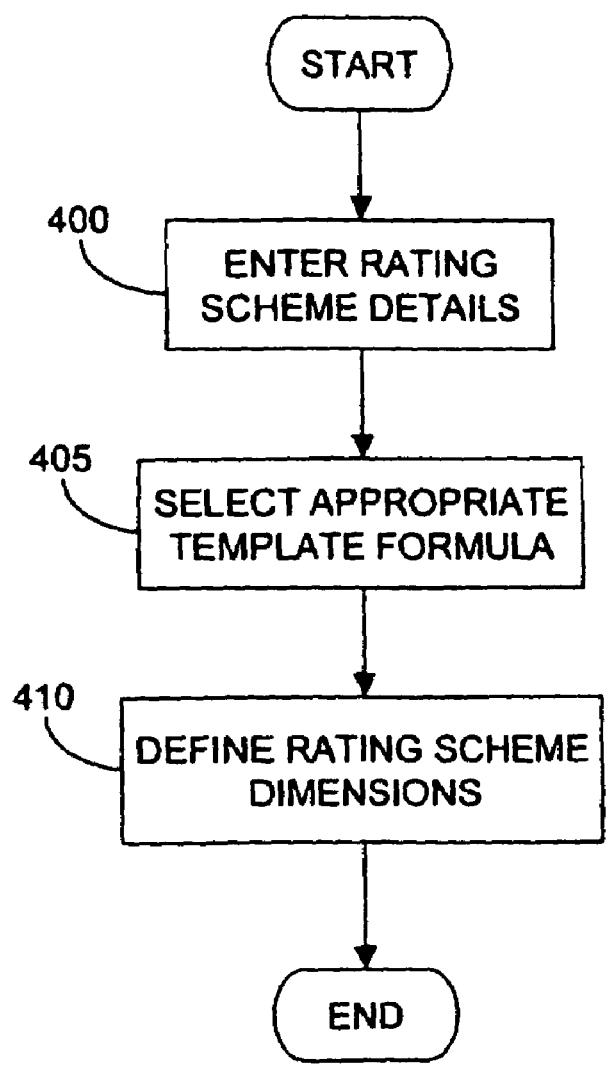
FIG. 4 is a flow diagram showing, in more detail, the steps in implementing step 310 of FIG. 2, according to a preferred embodiment of the present invention.

Referring to FIG. 4, and additionally to FIG. 2, the first step in defining a rating scheme (205) is, at STEP 400, to enter top level details of the rating scheme (205), in particular to specify an identifier for the rating scheme, the number of tariff dimensions and the number of rate parameters to be used by the rating scheme (205). At STEP 405, an appropriate template formula (220) is selected, optionally from one of a number of predefined templates, having a pricing formula of the most appropriate structure given the tariff rules for the product or service. The pricing formula (220) will typically comprise an arbitrarily complex function of one or more unspecified tariff dimensions and one or more unspecified rate parameters. If an appropriate template formula (220) does not exist within the tariff rate model, a new template may be created at this stage. Creation of a new template is described in the worked example that follows this general discussion of the preferred process.

At STEP 410, the rating scheme tariff dimensions (210) are defined for the particular product or service, the number of tariff dimensions having been defined in the rating scheme details at STEP 400. The definition of each rating scheme tariff dimension (210) comprises an identifier for the dimension, each identifier corresponding to one of the specific tariff dimensions identified from STEP 300, and an index value for the dimension. If it is intended that the specific tariff dimension is to be used directly in the pricing formula, then the index value for that dimension is chosen to be the same as that of the appropriate unspecified tariff dimension in the template pricing formula (220), thereby creating an association between an unspecified tariff dimension in the template pricing formula (220) and a specific tariff dimension for the product or service. That completes the definition of the rating schemes (205) in the tariff rate model.

The STEP 315 for defining each of the product categories (200) identified from STEP 300 itself comprises several steps as will now be described with reference to FIG. 5. As was described above with reference to FIG. 2, a product category (200) may be defined in the tariff rate model and linked to an appropriate rating scheme (205). The tariff space defined by the identified tariff dimensions for the product category (200) may be divided into of one or more product category bands (225), each band defining a region (230) in the tariff space over which the vector R of rate parameter values in the rating scheme (205) is constant, and for each band (225) the applicable rate parameter vector R.

Figure 5:
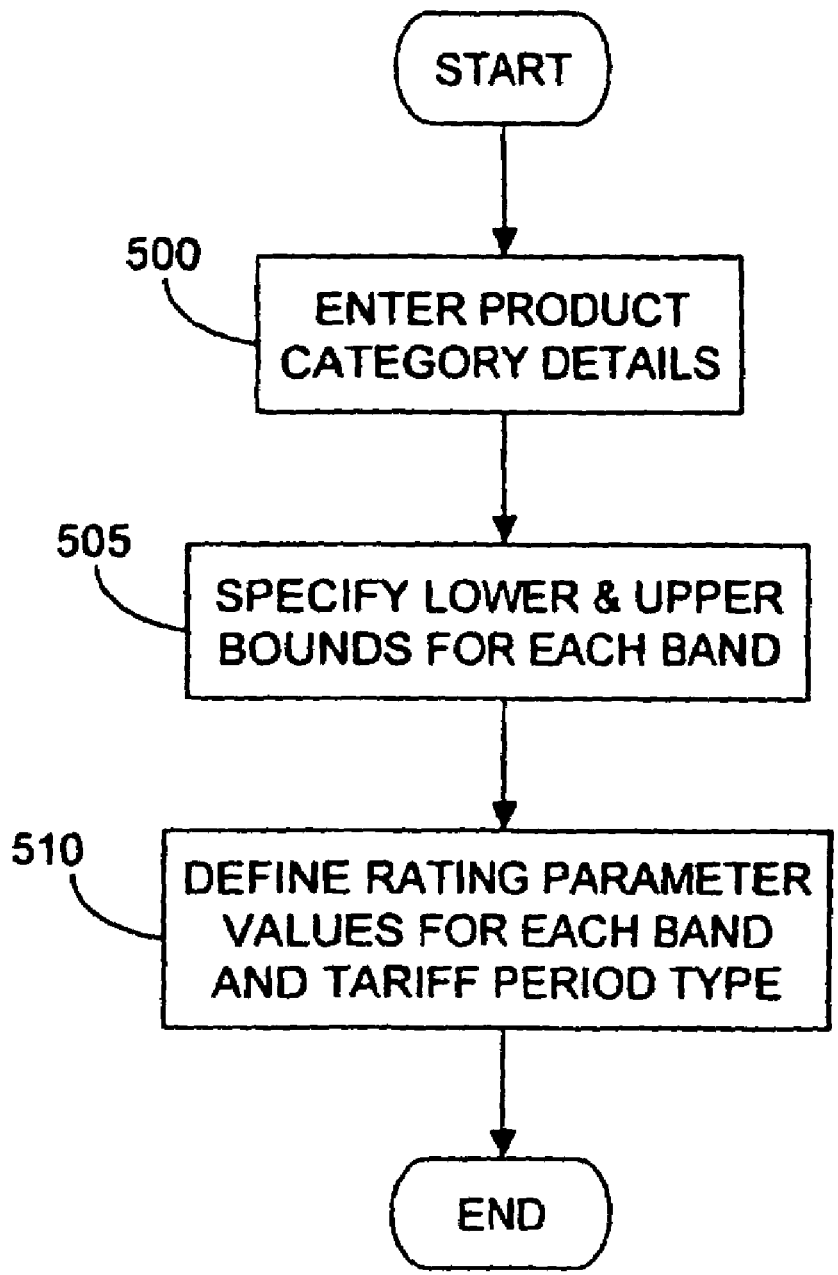
FIG. 5 is a flow diagram showing, in more detail, the steps in implementing step 315 of FIG. 2, according to a preferred embodiment of the present invention.

Referring to FIG. 5, and additionally to FIG. 2, the first step in defining a product category (200) in the tariff rate model is, STEP 500, to enter details (in particular, an identifier and status) of the product category (200), including an association with an appropriate rating scheme (205) as defined in STEP 310. At STEP 505, each of the (one or more) product category bands (225) is defined, each band representing a region in the tariff space of price-affecting tariff dimensions identified in STEP 305 over which a constant vector R of rate parameters is used in the respective rating scheme (205). Each product category band (225) is defined in terms of lower and upper bounds (230) for one or more of the tariff dimensions. For each defined band (225) the specific vector R of rate parameters (235) to be applied for pricing instances of the product category (200) falling within that region of tariff space is also defined and stored. If required, different rating vectors R may be stored for a particular band for each of a number of different tariff period types (240), as discussed above. This then completes the definition of a product category (200) in the tariff rate model.

WORKED EXAMPLE

The steps in operation of the preferred process described above with reference to FIGS. 3, 4 and 5 will now be described in the context of a specific product example, namely the applicant's Kilostream® product.

The following tariff table defines an example set of published annual rental tariffs for the Kilostream® product.

| | | Transmission Rate | |
| --- | --- | --- | --- |
| | Operative Date | Low Speed (2.4, 4.8 & 9.6 Kbit/s) | High Speed (19.2, 48 & 64 Kbit/s) |
| Each Local End PLUS Main Link: | Jan. 12, 1991 | £800.00 | £940.00 |
| Both ends of Main Link in Central London Zone | Jan. 12, 1991 | £112.00 | £112.00 |
| One or both ends outside Central London Zone: | | | |
| For the first 15 km, Per km or part | | £112.00 | £112.00 |
| Per additional km or part over 15 km | | £6.75 | £6.75 |

From a review of the business rules implicit in this table, it is clear that the Kilostream® product is comprised of two types of component: Local-Ends and Main-Links. Although the price of a Local-End is independent of distance, the price of a Main-link can be a function of distance. In general, therefore, it is possible to define a general pricing formula for determining the annual price of a KiloStream® component as follows:

Price=$r(0) \times$ distance+$r(1)$ where r(0) and r(1) are both appropriately selected constants.

In the case of a low-speed Local-end, the general pricing formula simplifies as follows, revealing values of r(0)=0 and r(1)=800:

Price=$0 \times$ distance+800=800

Similarly in the case of a low-speed Main link with at least one end outside London and a length less than 15 Km, the general pricing formula simplifies as follows, revealing values of r(0)=112 and r(1)=0:

Price=$112 \times$ distance+0=$112 \times$ distance

Finally in the case of a low-speed Main link with at least one end outside London and a length greater than 15 Km, the general pricing formula simplifies as follows, revealing values of r(0)=6.75 and r(1)=1578.75:

Price=6.75×(distance−15)+15×112=6.75×distance+ 1578.75

Thus the same structure of pricing formula applies to both local-end and main links, whether the transmission rate is low speed or high speed. Therefore, for this product, at STEP 300 of FIG. 3, it is identified that a single product category (200) will suffice for modelling tariffs in the tariff rate model.

Having identified the product category (200) appropriate for the product, the next step, STEP 305, is to identify and define the price-affecting tariff dimensions for the product For the Kilostream® product the price-affecting tariff dimensions are clearly component, length, speed, and zone. However, a fifth dimension of currency may also be defined, as will be seen below, enabling separate and independent price lists to be maintained if required.

The component dimension (called Kcomponent in this example) is to be defined as a textual dimension with the values 'Local-End' and 'Main-Link'.

The length dimension (called Klength in this example) is to be defined as a continuous numeric dimension in the range 0 to infinity.

The speed dimension (called Kspeed in this example) is to be defined as a discrete numeric dimension with the values 2.4, 4.8, 9.6, 48 and 64 Kbit/s.

The zone dimension (called Kzone in our example) is to be defined as a discrete textual dimension with the values "City of London" and "Other".

In practice, the step (305) of identifying tariff dimensions for a product takes place at the same time as the step (300) of identifying the breakdown of product categories (200). However, at STEP 305, the defined price-affecting tariff dimensions may now be entered into an appropriate database, optionally an extension to the tariff rate model structure, if not entered already. As was noted above, entities for storing information defining the valid ranges of tariff dimensions are not shown in the entity relationship diagram in FIG. 2 as this information is not essential to the tariff rate model itself. However, for completeness, an example of an XML data file for defining the tariff dimensions for the Kilostream® product example is as follows:

```
<?xml version="1.0"?>
<!DOCTYPE dbt SYSTEM "http://glossi.nat.bt.com/DTD/dbt.dtd">
<dbt language="English" date_format="dd-mm-yyyy">
    <domains>
        <!--
            Delete the domains first so that it is possible to
            process the document multiple times
        -->
        <domain name="Kcomponent" function="delete"/>
        <domain name="Kcomponent" type="text" size="10"
                units="component"
                start="today" stop="indefinite">
            <point value="Main-Link"/>
            <point value="Local-End"/>
        </domain>
        <domain name="Klength" function="delete"/>
        <domain name="Klength" type="numeric"
                subtype="continuous" size="10.02" units="Km"
                start="today" stop="indefinite">
            <range lower="0" upper="infinite"/>
        </domain>
        <domain name="Kspeed" function="delete"/>
```

-continued

```
        <domain name="Kspeed" type="numeric"
                subtype="discrete" size="3.01"
                units="Kbit/s"
                start="today" stop="indefinite">
            <point value="2.4"/>
            <point value="4.8"/>
            <point value="9.6"/>
            <point value="19.2"/>
            <point value="48"/>
            <point value="64"/>
        </domain>
        <domain name="Kzone" function="delete"/>
        <domain name="Kzone" type="text" size="20"
                units="Zone" start="today" stop="indefinite">
            <point value="City of London"/>
            <point value="Other"/>
        </domain>
    </domains>
</dbt>
```

Although, as stated above, it is assumed that only one language will be supported in the tariff rate model for the purpose of describing preferred embodiments of the present invention, it will be noted that the XML file above includes a language attribute providing a document-level definition of the language in which text attributes are to be interpreted, in this case "English".

The date_format attribute is used to select a date format in which subsequent dates appearing in the document are to be interpreted. Preferably, only a limited set of formats are supported. The format specified in the XML file above is interpreted as a 2-digit day number, followed by a '-', followed by a 2-digit month number, followed by another '-' followed by a 4-digit year number.

Note, firstly, that the "domain" element used here is a different entity to "dimension". Domains relate to the legal and permissible values for particular "measured" quantities. For example, distance values must be positive integers. A Kilostream® circuit component type can have only the values "Main Link" or "Local End". Thus domains define a spectrum of possible values, whereas dimensions are drawn from particular domains. Thus domains are all about data validation and are not essential components of the tariff rate model itself. However, the XML processor 135 is arranged to recognise the domain element and to store these data in an extension to the tariff rate model or separately from the tariff rate model itself, if required.

Note, further, that in the XML file above, the "type", "subtype" and "size" attributes of the domain element for Kcomponent define the Kcomponent domain to be a textual domain of size 10 characters. Further, note that the valid domain values are specified as a series of point sub-elements.

For the Klength domain, the "type", "subtype" and "size" attributes of the domain element define it to be a continuous numeric domain of 10 digits with a precision of 2 decimal places. Further, note that the range for this domain is specified via the single range sub-element.

For the Kspeed domain, the "type", "subtype" and "size" attributes of the domain element define it to be a discrete numeric domain with 3 digits and with a precision of 1 decimal place. Further, note how in this case, it is the point sub-elements that define the legal discrete domain values.

For the Kzone domain, the "type", "subtype" and "size" attributes of the domain element define it to be a textual domain of size 20 characters. Further, note that the legal domain values are specified via a series of point sub-elements.

Having defined the price-affecting tariff dimensions for the product, the next step, STEP 310, is to define the appropriate rating scheme (205). This step comprises, firstly, STEP 400 of FIG. 4, to enter top level details of the rating scheme (205) as defined for the rating scheme entity (205) described above with reference to FIG. 2. The next step, STEP 405, is to select the appropriate template formula (220) for the product. For the Kilostream® product, the general pricing formula was identified as being of the form $$\text{Price} = r(0) \times \text{distance} + r(1)$$

where r(0) and r(1) are both appropriately selected constants. If a predefined template (220) exists in the tariff rate model having a pricing formula of this form, then it may be linked at this step to the rating scheme (205). However, if no pricing formula of the correct format is available, then a new template may be created at this stage, corresponding in detail to the entity (220) described above with reference to FIG. 2. For completeness, an example of an XML data file that may be used to generate the appropriate template is as follows. For convenience, this XML data file causes the entry into the tariff rate model of both the rating scheme attributes (205) from STEP 400 and the template pricing formula from STEP 405 in one XML data file.

```
<?xml version="1.0"?>
<!DOCTYPE dbt SYSTEM "http://glossi.nat.bt.com/DTD/dbt.dtd">
<dbt language="English" date_format="dd-mm-yyyy">
    <templates>
        <!--
            Delete the template so that the it is possible to
                process the document multiple times
        -->
        <template name="MyLinear" function="delete"/>
        <template name="MyLinear" rates="2"
                dimensions="1"
                function.tariff="MyLinear.calc">
            <header>
                CREATE OR REPLACE PACKAGE MyLinear
                IS
                    FUNCTION calc Return DBT.tariff_t;
                    PRAGMA RESTRICT_REFERENCES
                    (calc, WNDS, WNPS);
                End MyLinear;
            </header>
            <body>
                CREATE OR REPLACE PACKAGE
                BODY MyLinear
                IS
                    FUNCTION calc Return DBT.tariff_t
                    Is
                    dims DBT.dimension_vector_t;
                    rates DBT.rate_vector_t;
                    BEGIN
                        DBT_Tariff.get_dimensions(dims);
                        DBT_Tariff.get_rates(rates);
                        return( rates(0)*dims(0) + rates(1) );
                    end;
                End MyLinear;
            </body>
        </template>
    </templates>
</dbt>
```

In order to be able to process the XML file multiple times, the first <template> element represents an instruction to delete any existing template with the name "MyLinear" (the attribute function="delete" defines this). Where no such template exists, as in the case when the XML document is processed for the first time, no error is generated, thus making the document truly re-runable.

The second <template> element in the above XML file specifies the name of the template ("MyLinear" in this example) and the number of rate parameters (in the rates vector) and dimensions to be used in the rating scheme (205). The number of rates is 2, since the general pricing formula being defined uses rate parameters r(0) and r(1). Similarly, there is only a single dimension in this formula (later to be defined as distance).

Finally, the header and body elements identify (in the template attribute function.tariff) a process (MyLinear.calc) that implements the template pricing formula defined to calculate a price for instances of the product category (200).

The next step in the preferred process is, STEP 410, to define the rating scheme dimensions (210) for the rating scheme (205). An example of an XML data file designed to input these data for the Kilostream® product is as follows:

```
<?xml version="1.0"?>
<!DOCTYPE dbt SYSTEM "http://glossi.nat.bt.com/DTD/dbt.dtd">
<dbt language="English" date_format="dd-mm-yyyy">
    <rating_schemes>
        <!--
            Delete the schemes first so that it is possible to
            process the document multiple times
        -->
        <rating_scheme name="Krating" function="delete"/>
        <rating_scheme name="Krating" template="MyLinear"
                start="today" stop="indefinite">
            <domain_mapping name="Klength" index="0"/>
            <domain_mapping name="Kspeed" index="1"/>
            <domain_mapping name="Kcomponent" index="2"/>
            <domain_mapping name="Kzone" index="3"/>
            <domain_mapping name="Currency" index="4"/>
            <rate name="Cost per Kilometer"
                units="Currency/Kilometer" index="0"/>
            <rate name="Fixed Cost"
                units="Currency" index="1"/>
        </rating_scheme>
    </rating_schemes>
</dbt>
```

The second rating scheme element creates a new rating scheme (205) based upon the previously selected, or created, template (220) "MyLinear". By means of a series of domain_mapping elements, the four previously created domains (tariff dimensions defined at STEP 305) Klength, Kspeed, Kcomponent and Kzone—rating scheme dimensions (210)—are added to the rating scheme (205). Similarly, a pre-defined dimension Currency is also added. Being on index 0, it is the Klength dimension that will be used in the MyLinear template formula (220), defined earlier.

Optionally, the rate elements may be used to define the names of the two rates inherited from the underlying template formula (220), MyLinear, and their respective units of measurement, although these data are not essential to the contents of the tariff rate model.

Having defined the rating scheme (205) at STEP 310, the final stage is, STEP 315, to formally define the product category in the tariff rate model for the Kilostream® product. To achieve this, the first step, STEP 500 of FIG. 5, is to enter top-level details of the product category as defined for the entity (200) described above with reference to FIG. 2, together with a reference to the rating scheme (205) to be used in pricing instances of this product category. The next steps, STEP 505 and 510 define the regions (product category bands (225)) of Kilostream® product tariff space in which the rate parameters are constant, and to store the respective rate parameters values for each region. An example of an XML data file designed to implement each of the process steps in FIG. 5 for the Kilostream) product is as follows:

```xml
<?xml version="1.0"?>
<!DOCTYPE dbt SYSTEM "http://glossi.nat.bt.com/DTD/dbt.dtd">
<dbt language="English" date_format="dd-mm-yyyy">
    <product_categories>
        <!--
            Delete the product category first so that it is
                possible to process the document multiple times
        -->
        <product_category name="KiloStream"
                         function="delete"/>
        <product_category name="KiloStream"
         rating_scheme="Krating" code="D000nn"
         type="recurring"
         GL.0="L2Code" GL.1="L2Code"
         start="01-12-1991" function="new">
            <!--
                Low-speed, Local-End
            -->
            <band start="01-12-1991" stop="indefinite">
                <band_definition>
                    <dimension.spec index="0" name="Klength"
                        lower="0" upper="infinite"/>
                    <dimension.spec index="1" name="Kspeed"
                        lower="2.4" upper="9.6"/>
                    <dimension.spec index="2"
                        name="Kcomponent" value="Local-End"/>
                    <dimension.spec index="3" name="Kzone"/>
                    <dimension.spec index="4"
                        name="Currency" value="GBP"/>
                </band_definition>
                <rates_definition period="Annual">
                    <rate.spec index="0" value="0"/>
                    <rate.spec index="1" value="800"/>
                </rates_definition>
            </band>
            <!--
                High-speed, Local-End
            -->
            <band start="01-12-1991" stop="indefinite">
                <band_definition>
                    <dimension.spec index="0" name="Klength"
                        lower="0" upper="infinite"/>
                    <dimension.spec index="1" name="Kspeed"
                        lower="19.2" upper="64"/>
                    <dimension.spec index="2"
                        name="Kcomponent" value="Local-End"/>
                    <dimension.spec index="3" name="Kzone"/>
                    <dimension.spec index="4"
                        name="Currency" value="GBP"/>
                </band_definition>
                <rates_definition period="Annual">
                    <rate.spec index="0" value="0"/>
                    <rate.spec index="1" value="940"/>
                </rates_definition>
            </band>
            <!--
                City-of-London Main-Link
            -->
            <band start="01-12-1991" stop="indefinite">
                <band_definition>
                    <dimension.spec index="0" name="Klength"
                        lower="0" upper="infinite"/>
                    <dimension.spec index="1" name="Kspeed"
                        lower="2.4" upper="64"/>
                    <dimension.spec index="2"
                        name="Kcomponent" value="Main-Link"/>
                    <dimension.spec index="3" name="Kzone"
                        value="City of London"/>
                    <dimension.spec index="4"
                        name="Currency" value="GBP"/>
                </band_definition>
                <rates_definition period="Annual">
                    <rate.spec index="0" value="0"/>
                    <rate.spec index="1" value="112"/>
                </rates_definition>
            </band>
            <!--
                Non-City-of-London Main-Link, <15 Km
            -->
            <band start="01-12-1991" stop="indefinite">
                <band_definition>
                    <dimension.spec index="0" name="Klength"
                        lower="0" upper="15"/>
                    <dimension.spec index="1" name="Kspeed"
                        lower="2.4" upper="64"/>
                    <dimension.spec index="2"
                        name="Kcomponent" value="Main-Link"/>
                    <dimension.spec index="3" name="Kzone"
                        value="Other"/>
                    <dimension.spec index="4"
                        name="Currency" value="GBP"/>
                </band_definition>
                <rates_definition period="Annual">
                    <rate.spec index="0" value="112"/>
                    <rate.spec index="1" value="0"/>
                </rates_definition>
            </band>
            <!--
                Non-City-of-London Main-Link, >15 Km
            -->
            <band start="01-12-1991" stop="indefinite">
                <band_definition>
                    <dimension.spec index="0" name="Klength"
                        lower="15" upper="infinite"/>
                    <dimension.spec index="1" name="Kspeed"
                        lower="2.4" upper="64"/>
                    <dimension.spec index="2"
                        name="Kcomponent" value="Main-Link"/>
                    <dimension.spec index="3" name="Kzone"
                        value="Other"/>
                    <dimension.spec index="4"
                        name="Currency" value="GBP"/>
                </band_definition>
                <rates_definition period="Annual">
                    <rate.spec index="0" value="6.75"/>
                    <rate.spec index="1" value="1578.75"/>
                </rates_definition>
            </band>
        </product_category>
    </product_categories>
</dbt>
```

The main element in this XML file is the "product_category" element that defines the name for the "KiloStream" product category (205). This element includes the key attributes of "rating_scheme", which references the applicable rating scheme (205) and hence the underlying pricing formula (220), and "type" which defines (tariff period type (240)) the charge to be recurring in nature.

Contained within this "product_category" element are the five key definitional blocks, consistent with the five sub-categories of tariff shown in the Kilostream® product tariff table shown above. These are:

Low-speed Local-Ends (2.4, 4.8 & 9.6 Kbit/s);
High-speed Local-Ends (19.2, 48,& 64 Kbit/s);
City-of-London Main-Link;
Non-City-of-London Main-Link less than 15 Km; and
Non-City-of-London Main-Link greater than 15 Km Each of these sub-categories is represented as a "band" element containing "band_definition" (225) and "rates_definition" (235) elements. The "band" element defines (225) the start and end dates by means of "start" and "stop" attributes. Where there is no scheduled stop date, the band is created "open" by setting the "stop" attribute to "indefinite".

The "band_definition" element is used to define a tariff band (230). This is achieved using a series of "dimension.

spec" elements, each of which identifies a range or value for the underlying tariff dimension. Generally, for discrete-valued dimensions, the "value" attribute is used to define the required dimension range, whilst for a continuous numeric dimension, the "lower" and "upper" attributes of the "dimension.spec" element are used. For discrete numeric dimensions it is also possible to use the "lower" and "upper" attributes instead of the "value" attribute in order to cover a range of values (e.g. for Kspeed it is possible to use the attribute pair lower="2.4" upper="9.6"). Where none of the "value", "lower" or "upper" attributes are specified, then the range of the associated dimension is the to be wholly open. Note that it is even possible to specify a textual dimension to be wholly open in this way.

The "rates_definition" element defines, for each band (225), the rating vector R comprised of the constant values for the rate parameters (235) associated with the underlying rating scheme (205) for that band (225), e.g. for the "City-of-London Main-Link" band, the applicable rating vector R=(0,112).

Pricing Process

With the tariff data entered into the tariff rate model, a pricing engine may be arranged to interrogate the model to obtain all the information necessary to calculate a price for specific instances of the product. In a further preferred embodiment of the present invention, a pricing process will now be described with reference to FIG. 6 for determining the price for an instance of a specific product with reference to a tariff rate model, as described above with reference to FIG. 2, for that product. In a typical implementation, a pricing engine 100 of FIG. 1 may be arranged to operate the pricing process of FIG. 6 in cooperation with a tariff rate modelling component 115 arranged to implement the tariff rate model of FIG. 2.

Figure 6:
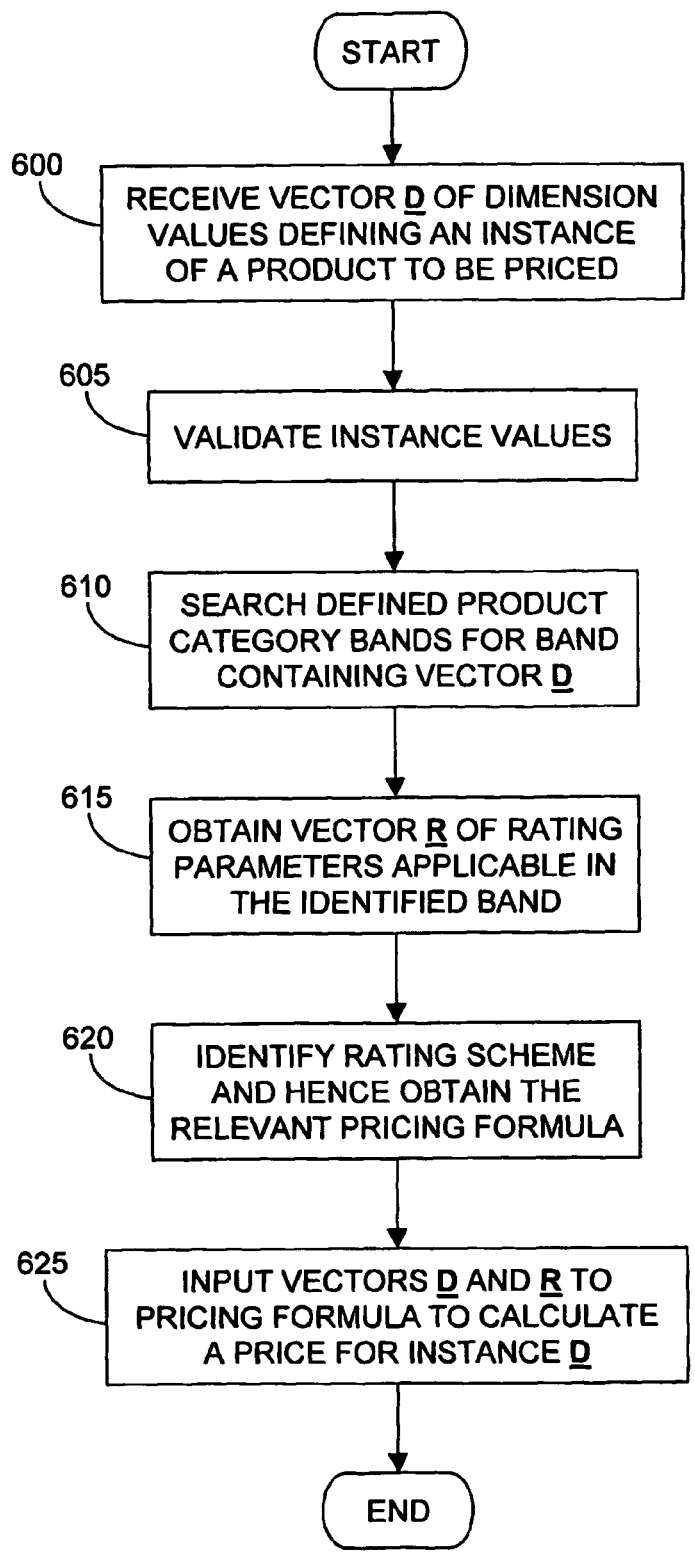
FIG. 6 is a flow diagram showing a preferred process for determining a price for a product or service with reference to a tariff rate model for the product or service generated according to a preferred embodiment of the present invention.

Referring to FIG. 6, the pricing process begins with, at STEP 600, receipt of a vector D of tariff dimension values for an instance of a specified product. It is assumed that if more than one category of the product has been defined, that the relevant category for the received instance of the product is identifiable. In a typical implementation of a billing system incorporating a tariff rate model and pricing process according to preferred embodiments of the present invention, a file containing a substantial number of defined instances may be input at STEP 600 as the input to a bulk billing run. At STEP 605, each input vector D is preferably validated with reference to a database of defined ranges for each component tariff dimension (see the worked example above for a description of the storage of data defining "domains"), although alternatively a validation step may be carried out on the instances data prior to receipt at STEP 600.

At STEP 610, the pricing process accesses the tariff rate model to identify which of the defined product category bands (225) contain the received instance vector D. The particular product category band (225) may be identified for example by making a dimension-by-dimension comparison of the respective instance value with the corresponding range definition (230) for each product category band (225) until a band is identified for which every dimension instance value in the vector D lies within the respective dimension range for that band.

At STEP 615, having identified the relevant product category band (225), the pricing process reads from the tariff rate model the corresponding rates vector R for that band (225) and, at STEP 620, identifies the applicable rating scheme (205) for the product category (200) and hence the pricing formula to be applied in calculating the price for the instance D.

At STEP 625, the pricing engine inputs the vectors D and R into the pricing formula to calculate and output a price for the input instance D. This process may then be repeated for each instance of the product or service input at STEP 600, if more than one.

Implementation

While the present applicants have implemented the tariff rate model by integrating the data entities into an existing billing system tariff database, any of a number of different known database management systems may be used to implement the tariff rate model either as a stand-alone database or integrated with an existing model, as would be apparent to a person skilled in the field of database design. For example, the tariff rate model may be implemented in a straightforward manner using a relational database management system such as ORACLE®. Further implementation detail will not therefore be provided in the present patent specification.

Further Applications of the Present Invention

As was mentioned in the introductory part of the present patent specification, preferred embodiments of the present invention may be applied to the modelling of rate information for other than telecommunications-related products or services. For example, in banking, interest rates payable on certain types of account may vary according to account balance, notice period for withdrawals, whether online or conventionally managed, etc. Modelling techniques used in generating a tariff rate model according to preferred embodiments of the present invention may be readily applied to the modelling of interest rates for banking products. Furthermore, embodiments of the present invention may be used in modelling any form of rate, whether or not the rates and the corresponding "pricing" formula applicable to a particular instance of a set of dimensions have any relation to the calculation of "prices" or other quantities in a financial context.

The invention claimed is:

1. An apparatus for determining a rate to be applied in respect of a data set comprising a value for at least one variable attribute in an electronic system or process, comprising:
   an input (105) for receiving the data set;
   a rate modelling component (115) arranged to store a model comprising:
   (i) data (205,210) defining a rating space having at least one dimension defined by an attribute of the electronic system or process;
   (ii) a rating vector definition comprising at least one rate parameter; and
   (iii) data (225,230) which defines distinct regions in the rating space (205,210) over which the defined rating vector is invariant, and which defines the respective invariant rating vector (235) for each distinct region; and
   rate determining means arranged, on receipt of the data set, to identify a corresponding one of the distinct regions (225,230), the respective invariant rating vector (235) and hence the rate to be applied in respect of the data set.

2. An apparatus according to claim 1, further comprising: calculating means for calculating an output (110) in respect of the data set by inputting one or more rate parameters (235) of the identified invariant rating vector into a predefined formula (220).

3. An apparatus according to claim 2, wherein the model further comprises a rule (205) for selecting a predefined formula (220) in respect of the data set from among a plurality of predefined formulae (220).

4. An apparatus according to claim 1, wherein in (i) the rating space (205, 210) is defined in terms of an orthogonal set of attributes of the electronic system or process.

5. An apparatus according to claim 1, wherein the model further comprises at least one rule (205) for selecting an appropriate rating space (205, 210), from among a plurality of rating spaces (205,210) defined in the model, on the basis of at least one attribute represented in the data set.

6. An apparatus according to claim 1, further comprising: an interface (120) to the modelling component (115) for processing data received at the interface and for making corresponding updates to the model, wherein the received data are formatted according to a pre-defined markup language and wherein different data elements of the pre-defined mark-up language relate to different entities within the model.

7. An apparatus according to claim 6, wherein the pre-defined markup language is defined according to the extensible markup language standard.

8. An apparatus according to claim 1, wherein the defined rating vector relates to the rate of utilisation of one or more resources associated with the electronic system or process.

9. An apparatus according to claim 1, wherein the defined rating vector relates to a tariff to be applied in respect of use of the electronic system or process.

10. An apparatus according to claim 1, for use in determining a rate of utilisation of a resource in respect of a product or service.

11. A method for determining a rate to be applied in respect of a product or service, comprising:
(i) defining a rating space (205,210) having at least one dimension defined by an attribute of the product or service;
(ii) defining a rating vector comprising at least one rate parameter;
(iii) determining distinct regions (225,230) in the rating space (205,210) over which the defined rating vector is invariant and defining values (235) for the at least one rate parameter in the invariant rating vector for each distinct region (225,230);
(iv) for a specified instance of the product or service, identifying a corresponding one of the distinct regions (225,230) from (iii), the respective invariant rating vector (235) and hence the rate to be applied.

12. A method according to claim 11, further comprising the step: (v) using the respective invariant rating vector (235) in a predefined formula (220) to calculate an output (110) in respect of the specified instance of the product or service.

13. A method according to claim 11, wherein at step (i) the rating space (205,210) is defined in terms of an orthogonal set of dimensions for the product or service.

14. A method according to claim 11, wherein the rate relates to the rate of utilisation of a resource in respect of the product or service.

15. A method according to claim 11, wherein the rate relates to a charging rate to be applied in determining a price for use of the product or service.

16. A method of generating a model of rates to be applied in respect of a product or service, comprising the steps of defining, in the model:
(i) a rating space (205,210) for the product or service having at least one dimension defined by an attribute of the product of service;
(ii) a rating vector definition comprising at least one rate parameter;
(iii) at least one distinct region (225,230) in the rating space (205,210) over which the defined rating vector is invariant; and
(iv) in respect of each distinct region from (iii), values (235) for the at least one rate parameter of the respective rate vector.

17. A method according to claim 16, further comprising the steps of defining, in the model:
(v) at least one category (200) of the product or service for which a common rating space (205,210) applies; and
(vi) at least one rule for selecting an applicable rating space (205,210), from among a plurality of rating spaces (205,210) defined in the model, to be applied in respect of the at least one category (200) defined in (v).

18. A method according to claim 17, further comprising the steps of defining, in the model:
(vii) a reference to a formula (220) for use in calculating an output (110) in respect of the at least one category (200) identified in step (v), the formula (220) being a function of at least one unspecified dimension and at least one rate parameter; and
(viii) in respect of the at least one category (200) defined in (v), an association (210) between the at least one unspecified dimension in the formula (220) and a dimension for the applicable rating space (205,210).

19. A method according to claim 18, further comprising the step of defining, in the model:
(ix) an association between the at least one rate parameter in the formula (220) and a rate parameter (235) of the rating vector defined for the applicable rating space (205,210).

20. A method for determining the utilisation of a resource in respect of an instance of a product or service with reference to a rate model generated for the product or service by the method of claim 17, comprising the steps of:
(i) receiving (105) data defining an instance of the product or service;
(ii) identifying a distinct region (225,230) in a rating space (205,210) for the product or service containing the defined instance received (105) at step (i);
(iii) identifying the invariant rating vector (235) applicable to the identified region (225,230);
(iv) identifying a formula (220) to be applied to instances of the product or service; and
(v) inputting the at least one rate parameter value (235) of the invariant rating vector and the received data (105) defining the instance into the formula (220) to calculate (100) the utilisation of the resource for the instance of the product or service.

* * * * *